United States Patent [19]

Schroeder

[11] 4,257,497
[45] Mar. 24, 1981

[54] MAGNETICALLY TRIGGERED AND ELECTRONICALLY CONTROLLED TORSION BRAKE

[76] Inventor: Karl S. Schroeder, Clayton, Ohio

[21] Appl. No.: 961,874

[22] Filed: Nov. 17, 1978

Related U.S. Application Data

[63] Continuation-in-part of Ser. No. 777,355, Mar. 14, 1977, abandoned.

[51] Int. Cl.³ .............................................. F16D 51/04
[52] U.S. Cl. ................................ 188/77 W; 188/82.6; 188/85; 188/266; 188/181 R; 192/35; 192/84 T; 301/6 W
[58] Field of Search ................. 188/2 A, 18 R, 77 W, 188/134, 158, 161, 163, 164, 181 R, 181 C, 181 T, 82.6, 85, 266; 301/6 R, 6 W; 192/35, 48.3, 55, DIG. 2, 26, 84 T; 310/93, 95

[56] References Cited

U.S. PATENT DOCUMENTS

| | | | |
|---|---|---|---|
| 59,805 | 11/1866 | Achard | 188/161 |
| 589,779 | 9/1897 | Hall | 188/77 W |
| 780,568 | 1/1905 | Lockwood | 188/85 X |
| 1,443,703 | 1/1923 | Divelhiss | 188/77 W |
| 1,869,876 | 8/1932 | Apple | 188/18 R |
| 1,882,050 | 11/1932 | Whyte | 188/161 |
| 2,239,459 | 4/1941 | Kattwinkel | 188/181 T |
| 2,243,449 | 5/1941 | Aikman | 188/2 A |
| 2,304,118 | 12/1942 | Thair | 188/161 |
| 2,322,335 | 6/1943 | Anderson | 188/163 |
| 2,407,510 | 9/1946 | Oetzel | 188/161 |
| 2,637,415 | 5/1953 | Winther | 188/161 |
| 2,798,581 | 7/1957 | Supitilov | 192/35 |
| 2,829,748 | 4/1958 | Sacchini et al. | 192/26 |
| 2,939,561 | 6/1960 | Rudisch | 192/55 |
| 2,976,976 | 3/1961 | Parker | 192/35 |
| 3,031,038 | 4/1962 | Chait | 188/111 |
| 3,185,276 | 5/1965 | Sajovec, Jr. | 192/35 |
| 3,232,399 | 2/1966 | Harned et al. | 192/26 X |
| 3,618,716 | 11/1971 | Studdard et al. | 188/18 R |
| 3,648,810 | 3/1972 | Weatherby | 192/26 |
| 3,685,622 | 8/1972 | Baer et al. | 192/48.3 X |
| 3,704,770 | 12/1972 | Spencer | 188/164 |
| 3,734,245 | 5/1973 | Hubbard | 188/163 |
| 3,756,355 | 9/1973 | Kreider | 188/138 |
| 3,759,358 | 9/1973 | Quenneville | 310/93 |
| 3,837,450 | 9/1974 | Malion et al. | 192/35 X |
| 3,897,857 | 8/1975 | Rodaway | 188/77 W |

Primary Examiner—George E. A. Halvosa
Attorney, Agent, or Firm—Dybvig & Dbyvig

[57] ABSTRACT

A vehicle braking system including a wheel hub, a hub member separate from the wheel hub, a torsional coupling device and a magnetically actuable brake spring. In a preferred embodiment, the hub member is connected to the vehicle suspension by the torsional coupling device and, upon actuating, the brake spring wraps around the wheel hub to cause the hub member and the wheel hub to be nonrotatably joined together. In another embodiment, the wheel hub is torsionally connected to the hub member and actuation of the brake spring causes the hub member to be nonrotatably joined to the vehicle suspension. The movements of the wheel hub relative to the vehicle suspension permitted by the torsional coupling are monitored by an electronic control circuit that guards against wheel lockup or skid conditions. The electronic control circuit intermittently triggers the brake spring between brake release and approaching wheel lockup so as to incorporate anti-skid performance with the brake function. The braking system is disclosed for use with both a free-wheeling or nondriven wheel and a driven wheel.

17 Claims, 9 Drawing Figures

MAGNETICALLY TRIGGERED AND ELECTRONICALLY CONTROLLED TORSION BRAKE

RELATED APPLICATION

This is a continuation in part of my application Ser. No. 777,355, filed Mar. 14, 1977, now abandoned.

BACKGROUND OF THE INVENTION

1. Field of the Invention

The present invention relates to vehicle brake systems and more particularly to a substantially friction-free, magnetically triggered braking system for coupling a vehicle wheel to a vehicle suspension by means of a torsional energy-absorbing system.

2. Prior Art

It is known in the art to accomplish braking operations by means of belts or bands which are magnetically contracted in length so as to cause the belt or band to wrap upon or against a rotating member, such as a wheel or drum, thus acting as a brake. It has been the practice in such systems to rely upon friction with the belt or band and consequent heat generation as a means for absorbing the energy associated with the vehicle or other moving element which is to be braked. The difficulties encountered with such braking systems in the prior art have involved the need for a magnetically actuated mechanical linkage for moving the belt or the like to initiate a braking action and have furthermore involved substantial amounts of frictional wear and heat generation, with the result that the operating life of such braking systems is reduced by the frictional wear of the belt or band.

SUMMARY OF THE INVENTION

In the present invention, frictional wear and consequent heat generation is minimized by use of a convoluted spring. Means to create a magnetic field in proximal relation to the spring are utilized to bias a portion of the spring to frictionally engage a cylindrical hub connected to the vehicle wheel in such fashion that the motion of the wheel supplies the energy required to wrap the spring against the hub. Since the engagement results primarily from a wrapping action, sliding friction is nominal and in fact virtually nonexistent.

Torsion means resists movement of the wheel when the braking action is occurring. Electronic control means including means to sense relative movements of the parts indicative of the stress applied to or the displacement of the torsion means functions to release the grip of the brake spring at appropriately timed intervals so as to maximize vehicular deceleration while also avoiding wheel lockup conditions which might produce a skid. The efficiency of energy dissapation is improved in the present invention by utilizing a low friction transfer of energy through the torsion means.

BRIEF DESCRIPTION OF THE DRAWINGS

FIG. 8 is a section view of the embodiment of FIG. 7 taken substantially along the line of 8—8 thereof and also illustrates by the line 7—7 the planes at which FIG. 8 is substantially broken away.

DESCRIPTION OF THE PREFERRED EMBODIMENTS

For purposes of illustration, the present invention is disclosed in a form suitable for use as a brake for a vehicle wheel. FIGS. 1, 2, 3 and 4 depict, in particular, the application of the present invention to nondriven or free-wheeling automobile wheels. FIG. 5 illustrates the present invention as a brake for a driven or powered automobile wheel.

Although the present invention is being described in reference to brakes for vehicles such as automobiles and airplanes, it will be apparent to those skilled in the art that the present invention is applicable to the braking of diverse forms of movement and is not limited in its field of applications to vehicular wheel movements.

Figure 1:
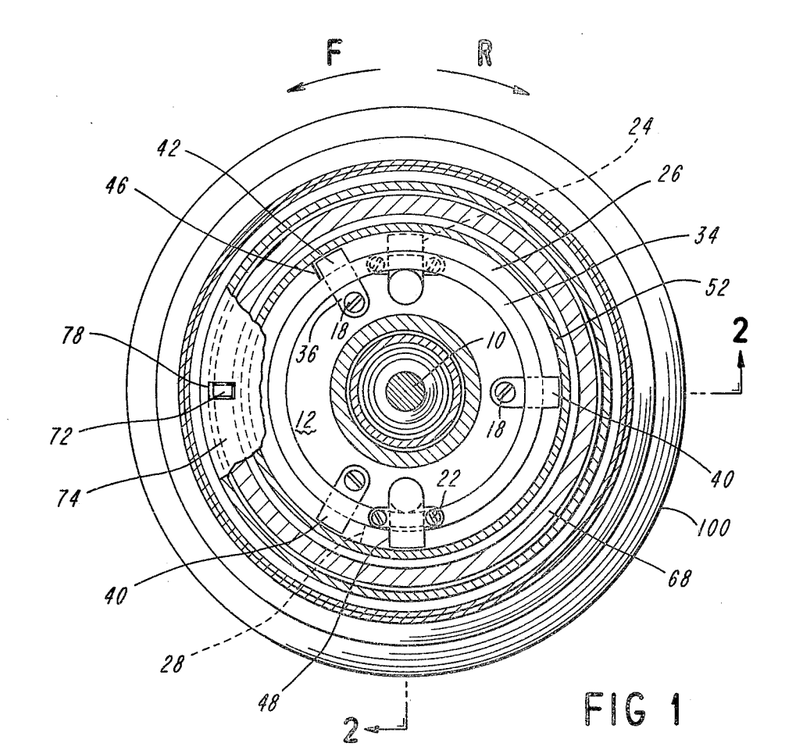
FIG. 1 is an elevation view of a brake assembly in accordance with the present invention, a substantial portion of the assembly having been broken away to reveal greater detail.
Figure 2:
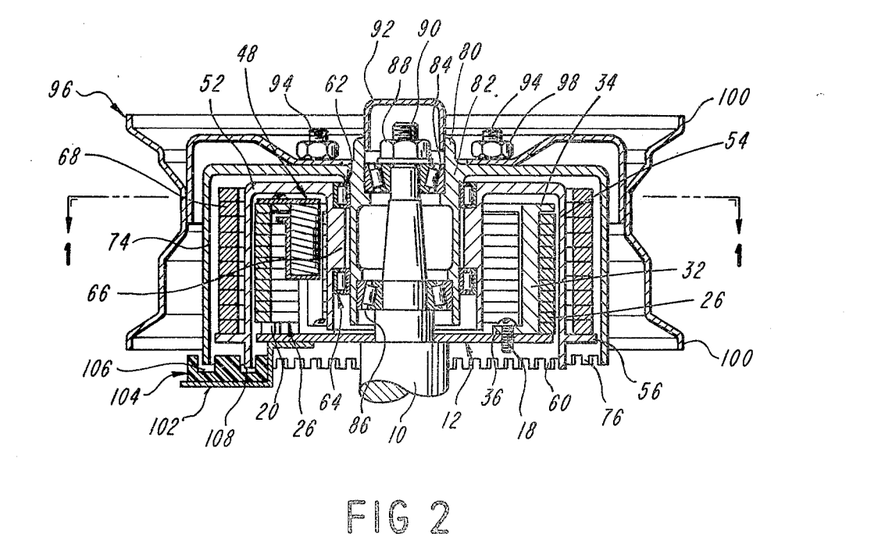
FIG. 2 is a section view taken substantially along the line 2—2 of FIG. 1 and also illustrates by the line 1—1 the plane at which the assembly in FIG. 1 is substantially broken away.
Figure 3:
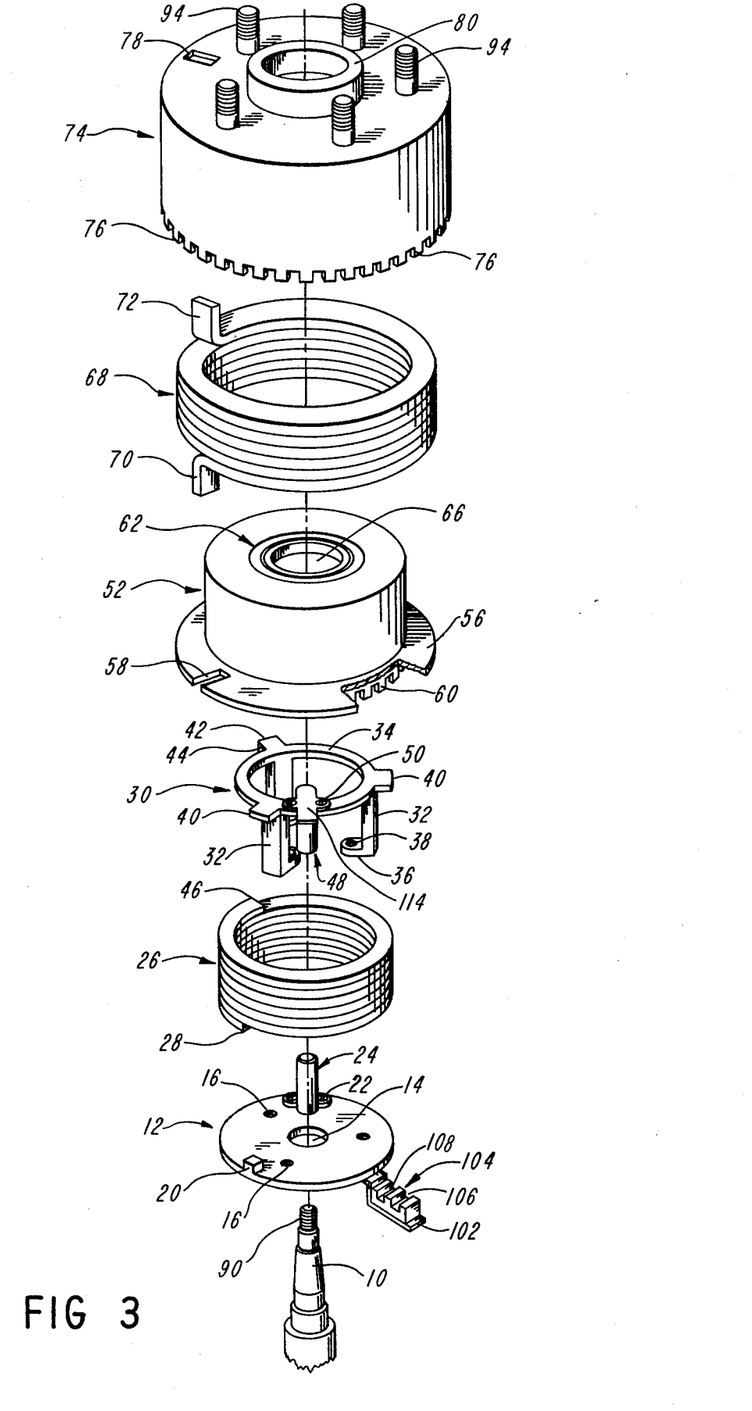
FIG. 3 is an exploded perspective view of the brake assembly.

Referring initially to FIGS. 1 and 3, the brake assembly of the present invention is illustrated in reference to the stationary axle 10 of the nondriven wheel of a vehicle, such as an automobile. The brake assembly may be considered as the front wheel assembly for an automobile having a rear wheel drive. Placed upon the axle 10 is a plate member 12 having a central aperture 14 adapted to receive the axle 10. The plate member 12 is provided with three equiangularly and circumferentially spaced apertures 16 for the receipt of bolts 18, illustrated in FIG. 2, for attachment of the plate member 12 to a nonrotatable portion of the wheel suspension.

The plate member 12 includes an outboard abutment member 20 disposed adjacent the outer periphery thereof. Also affixed to the plate member 12 by suitable fasteners, such as threaded screws 22, is an electromagnet device 24, the device 24 standing upwardly from the plate member 12 at a location disposed inwardly of the circular margin of the plate member 12. The electromagnet device 24 and the abutment member 20 perform functions to be described later.

Positioned concentrically to the plate member 12 is a tightly convoluted, helically coiled brake spring 26 having a rectangular cross section. The end 28 of the lowermost convolution of the brake spring 26, appearing toward the right in FIG. 3, is positioned in closely spaced, nearly abutting relationship to the clockwise face of the abutment 20.

The brake spring 26 is held in a concentric relation to the plate member 12 by means of a spider 30 comprising three upstanding legs 32 extending downwardly from an annular ring 34. The legs 32 terminate at their lower ends with radially inwardly directed feet 36 which are affixed to the plate member 12 by the aforementioned bolts 18 which pass through suitable apertures 38 located in the feet 36. The legs 32 are circumferentially spaced and arranged to fit closely to support the convoluted brake spring 26.

Projecting outwardly from the ring 34 above each of the legs 32 is a radially disposed arm, two of the three arms being of the same thickness and identified by the reference number 40. A third arm 42 has integrally added to its thickness a dependent lug 44 which is adapted to engage the end 46 of the uppermost convolution of the brake spring 26. With the spider 30 loosely holding the spring 26 and the ends 28 and 46 of the spring confined by the abutment 20 and lug 44 in the fashion described, it will be noted that the brake spring 26 has only a limited freedom for rotary movement about the spider 30. In view of the fact that the brake spring 26 is not fixedly attached in its mounting, it is convenient to consider this spring as having a floating mount, notwithstanding the fact that the spring is caged against any substantial rotary movement.

A second electromagnet device 48 comparable to the aforementioned device 24 is supported in downwardly depending relation to the ring 34 by means of suitable fasteners 50. It will be noted that, following assembly, the device 48 is located approximately diametrically opposite the comparable electromagnet device 24, the device 24 being located approximately 110° from the lower end 28 of the brake spring 26 and the device 48 being located approximately 110° from the upper end 46 of the same spring 26. As will be apparent from following remarks, the indicated 110° spacing from the ends of the brake spring 26 is not critical. However, as will be explained, a close proximity of operating portions of the electromagnet devices 24 and 48 to the upper and lower convolutions of the brake spring 26 is an important consideration.

Mounted in surrounding relation to the brake spring 26 is an inner or internal hub 52. As appears in FIG. 2, the hub 52 has an internal wall 54 which closely fits the outer periphery of the brake spring 26 but ordinarily does not rub thereagainst. The hub 52 has a radially outwardly directed flange 56 integral with and surrounding the lower edge thereof as appears in FIG. 3, the flange 56 fully encircling the hub 52 except where interrupted by a radially disposed notch 58. A portion of the flange 56 has been broken away for illustrative purposes so as to reveal uniformly spaced, downwardly depending teeth 60, whose function will be later described.

The upper end of the hub 52 has been apertured to receive the inner and outer races of a roller bearing assembly 62. As appears in FIG. 2, a comparable roller bearing assembly 64 is mounted within a sleeve 66 extending concentrically and internally of the hub 52 with which the sleeve 66 is one piece.

A torsion spring member 68 encircles the internal hub 52 and has a lug 70 depending from the lowermost convolution thereof into the radially disposed notch 58 formed in the flange 56 of the interior hub 52. The torsion spring 68 is thus restrained against any extensive rotation about the hub 52.

The torsion spring 68 is a tightly wound, helically coiled strap of spring steel. The uppermost convolution of the torsion spring 68 as it appears in FIG. 3 terminates with an upturned lug 72, whose function will be described shortly. In FIG. 3, the brake spring 26 appears as a left-hand helix. For reasons to be more fully explained, the spring 68 is preferably a right-hand helix.

The torsion spring 68 is somewhat loosely surrounded, as is evident in FIG. 3, by an outer hub 74 having downwardly depending, equally spaced teeth 76. The upper surface of the hub 74 has an aperture 78 to receive the lug 72 extending upwardly from the torsion spring 68, and an upwardly projecting, annular collar 80 which, by reference to FIG. 2, can be seen to comprise the upper portion of a tubular internal wall 82. The outer surface of the internal wall 82 is received in the internal race of the bearing assembly 62. Supported within the tubular wall 82 are axially spaced bearings 84 and 86 which may be conventional tapered roller bearings.

Within the aforementioned collar 80, a nut 88 tightens upon a threaded end 90 of the axle 10 in conventional fashion to axially secure the bearings 84 and 86, with the consequence that the outer hub 74 is retained against axial movement relative to the axle 10 but is rotatable freely about the axle 10. The nut 88 and the threaded end of the axle 10 are protected by a conventional dust cover 92 press fitted into the collar 80.

The fit of the outer hub 74 and the inner hub 52 with respect to the torsion spring 68 is such that the torsion spring 68, when exposed to a torque applied to the outer hub 74, will permit relative rotations to occur between the outer hub 74 and the inner hub 52 without the spring 68 coming into abrasive rubbing contact with the confining walls of the hubs 52 and 74.

Projecting upwardly from the outer hub 74 and arranged in concentric relation to the collar 80 are a plurality of mounting bolts 94. The mounting bolts 94 enter suitable apertures, not detailed in the drawings, located in a wheel rim 96 (FIG. 2) which is secured to the outer hub 74 by means of nuts 98 in conventional fashion.

The wheel rim 96 is a conventional rim structure having outwardly flared walls 100 for the retention thereon of a conventional tire, not shown.

Referring further to the plate member 12 and more particularly to the illustration thereof in FIG. 2, it can be noted that the plate member 12 has welded or otherwise affixed thereto an offset shelf 102 adapted to support thereon a conventional turns counter 104 having a first notch 106 therein through which the teeth 76 depending from the outer hub 74 freely progress and having a second notch 108 therein through which the teeth 60 depending from the inner hub 52 freely progress. The hubs 52 and 74 and especially the hub 52 are ferromagnetic materials, and the turns counter 104 comprises a conventional proximity switch mechanism, not shown, which senses the passage of the teeth 60 and 76 through the slots thereof so as to output square wave signals during the occurrence of rotations of the hubs 52 and 74, such square wave signals allowing identification by conventional electronic circuitry, not detailed in this application because well known, of the relative positions and relative velocities of the hubs 52 and 74. Inasmuch as the turns counter 104, as well as the electronic circuitry associated therewith, are well known in the art, no effort has been made to display electrical connections to the turns counter 104 shown in the drawings.

Figure 4:
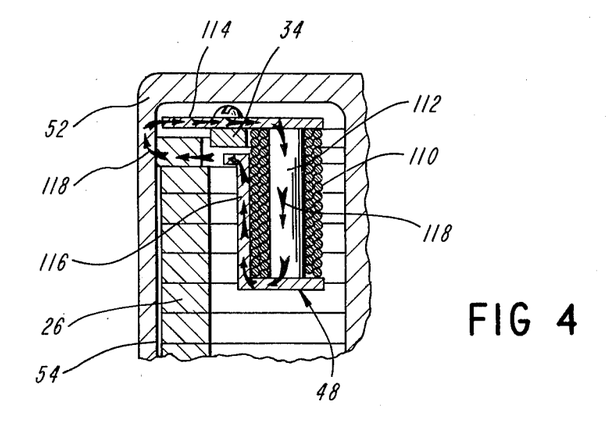
FIG. 4 is a fragmentary sectional view showing an electromagnet as employed in the present invention.
Figures 5, 6:
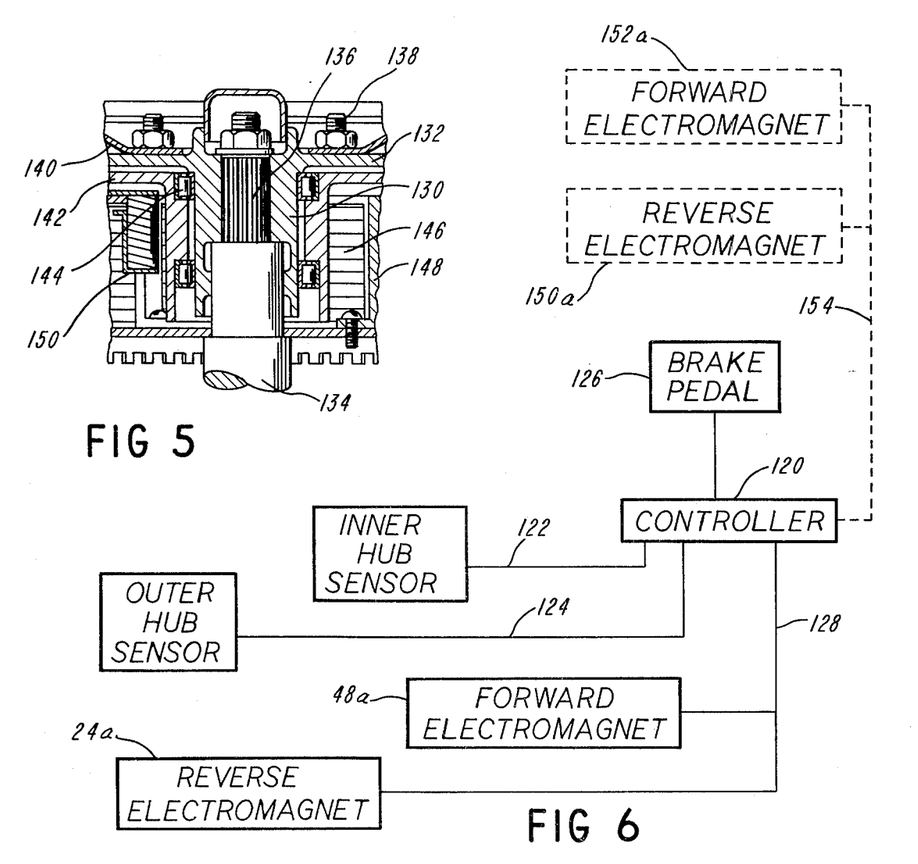
FIG. 5 is a fragmentary sectional view analogous to FIG. 2, illustrating the brake assembly on a driven wheel.
FIG. 6 is a diagrammatic illustration of electrical connections suitable for use in the present invention.

The electromagnet device 48 appears in section in FIG. 4, where the device 48 can be seen to comprise a wound solenoid coil 110 surrounding a core 112 having affixed to one end thereof a radially outwardly projecting flux carrier 114. The carrier 114 cooperates with an axially extending and outwardly projecting flux carrier 116 affixed to the opposite end of the core 112 to provide an air gap opposite the uppermost convolution of the brake spring 26 as that spring appears in FIG. 4. Appearing within the air gap between the flux carriers 114 and 116 in FIG. 4 is the annular ring 34 of the spider 30. For the purposes of this invention, the ring 34 is a nonferromagnetic metal so as not to reduce the air gap between the flux carriers 114 and 116.

It should be noted that the flux carrier 114, while not permitted to rub the inner hub 52, which is ferromagnetic, is located close to the interior wall of the inner hub 52. This makes the hub 52 a part of the flux path associated with the electromagnet device 48.

Furthermore, the brake spring 26, while not mounted to normally rub the interior wall of the inner hub 52, is ferromagnetic and in such close proximity to the interior wall of the inner hub as to also be a part of the flux path associated with electromagnet 48.

Thus referring to FIG. 4, where the flux path is indicated by the arrows 118, it can be seen that the principal flux path associated with the electromagnet device 48 proceeds from the flux carrier 116 by induction through the uppermost convolution of the brake spring 26, which is shown as rubbing the hub 52 in consequence of energization of the coil 110 to produce the indicated flux path, and then through the ferromagnetic material of the inner hub 52 by induction. Thus, when the electromagnet device 48 is energized, the uppermost convolution of the brake spring 26 is attracted to two magnetic poles, the one pole being associated with the flux carrier 116 radially inwardly thereof and the other pole being associated with the magnetic field induced in the inner hub 52, which lies close to the uppermost convolution of the brake spring 26. As well known to those skilled in the art, the uppermost convolution of the brake spring 26 will respond to energization of the electromagnet device 48 so as to minimize the aggregate air gap; and, in this case, the uppermost convolution will move toward contact with the closer of the two magnetic poles separated by the air gap and will thus move to contact the interior wall 54 of the inner hub 52, as is shown in FIG. 4.

The electromagnet 24 is constructed essentially the same as already described in reference to the electromagnet 48, the only important difference being that the electromagnet 48 extends downwardly from the spider ring 34, and the electromagnet 24 projects upwardly from the plate member 12. As described, the electromagnet 48 biases the upper end 46 of the brake spring 26 outwardly when energized. The operation of the electromagnet 24 is of a similar nature, the electromagnet 24 operating when energized to bias the lower end 28 of the brake spring 26 outwardly.

Having reference to FIGS. 1 and 3 of the drawings, the electromagnet 48 when energized is effective to frictionally lock the inner hub 52 against rotation about the axle 10 which that hub surrounds and the outer hub 74 is seeking to drive the inner hub 52 in the counterclockwise direction. In contrast, the electromagnet 24 is effective to lock the inner hub 52 against rotation about the axle which it surrounds only when the outer hub 74 is seeking to rotate the inner hub 52 in the clockwise direction.

Assuming the brake assembly as seen in FIG. 1 would be associated with the left front wheel of a vehicle such as an automobile, a counterclockwise outer hub rotation, in the direction of the arrow F, would indicate a forward motion of the automobile. Such rotation would be transferred to the inner hub 52 via the torsion spring 68. Having reference to such motion, it can be noted in FIG. 3 that an energization of the electromagnet device 48 will cause the uppermost end of the brake spring 26 to engage frictionally with the internal wall of the inner hub 52, which is rotating in the counterclockwise direction. Such frictional engagement will cause the uppermost convolution of the brake spring 26 and successively thereafter each succeeding convolution to unwind outwardly toward greater diameters. The initial friction following energization of the electromagnet device 48 will also expose the brake spring 26 to a counterclockwise torque from the hub 52, which will tend to rotate the brake spring as a whole in the counterclockwise direction. However, any such rotation is abruptly terminated by a contact between the lowermost end 28 of the spring 26 and the abutment 20 standing up from the plate member 12. Since rotation of the brake spring 26 as a whole is abruptly terminated as soon as friction between the upper end thereof and the internal wall of the inner hub 52 occurs, the net effect of such friction is a force tending to forcibly unwrap or unwind the brake spring 26.

The consequence of this unwinding or unwrapping movement is that substantially all convolutions of the brake spring 26 move outwardly into firm contact with the inner hub 52. It can be assumed, of course, that the rim 96 is rotating at the time the electromagnet device 48 is energized and has available to it substantially the entire momentum attributable to the motion of whatever mass is associated with the vehicle of which the rim 96 is a part. Clearly, the energization of the electromagnet device 48 was required only to initiate a relatively small friction between the brake spring 26 and the inner hub 52, whereupon the entire momentum of the vehicle associated with the rim 96 became available to forcefully unwrap the brake spring 26 against the internal wall of the hub 52.

In this regard, it should be considered that the forward motion of the vehicle at the time the electromagnet device 48 was energized was causing a rotation of the outer hub 74, the torsion spring 68 connected thereto and the inner hub 52 connected to the torsion spring. Thus the first things that will happen when the electromagnet device 48 is energized are that the brake spring 26 will seize upon the interior wall of the inner hub 52 to terminate the rotation of the inner hub, whereupon continued forward motion of the vehicle will cause the torsion spring 68 to commence a winding movement during which the spring 68 contracts radially inwardly and appreciable amounts of energy are stored in this torsion spring.

The seizure of the brake spring 26 to the inner hub 52 occurred within a small angle, such as 30°, of rotation of the rim 96 about the axis of the axle 10 and occurred with inappreciable amounts of rubbing friction and energy dissipation. Obviously, if the vehicle has any appreciable forward momentum, the torsion spring 68 will quickly wind inwardly and in so doing approach permanent distortion.

In the present invention, this imminent destruction of the torsion spring 68 is anticipated and prevented by means of the electronic circuitry schematically diagrammed with solid lines in FIG. 6. This circuitry comprises a controller 120 for sensing the operating condition of the vehicle wheels. The controller receives a first input 122 from a component labeled "INNER HUB SENSOR," this input being a square wave generated by the passage of teeth 60 of the inner hub 52 through the notch 108 of the turns counter 104. For reasons that will become apparent, it is not important that the controller 120 sense the direction of rotation of whichever wheel is to be braked.

The reference number 124 identifies a second input to the controller 120 from a component labeled "OUTER HUB SENSOR," which supplies a square wave representative of the frequency, but not the direction, with which the teeth 76 projecting downwardly from the outer hub 74 actuate the turns counter 104 by passage through the notch 106 of the turns counter.

Assuming the vehicle being controlled by the subject brake mechanism is in motion and brake pedal 126 (FIG. 6) has been depressed to effect a braking of the vehicle, a voltage supplied from the controller 120 passes over a conductor 128 equally to the forward braking electromagnet 48 (shown as a box 48a in FIG. 6) and to the reverse braking electromagnet 24 (shown as a box 24a in FIG. 6). If the vehicle is traveling in a forward direction, the electromagnet 24 will be energized, but will be ineffective to brake the vehicle because any resulting friction between the lower end 28 of the brake spring 26 and the inner hub 52 is incapable of producing a braking effect. Thus, such friction will be ineffective to cause the brake spring 26 to wrap against the inside wall of the hub 52.

In contrast, however, a simultaneous energization of the electromagnet 48 will cause the upper end 46 of the brake spring 26 to frictionally engage the internal wall of the hub 52, as previously described, with an abrupt braking action. Thus, during forward vehicle motion, the electromagnet 48 is effective to brake the vehicle, but the electromagnet 24, even though simultaneously energized, is ineffective for braking purposes. Likewise, when the vehicle is moving in the reverse direction, indicated by the arrow R in FIG. 1, both of the electromagnets 24 and 48 are energized simultaneously, but only the electromagnet 24 will be effective to initiate a braking action of the brake spring 26.

Assuming a forward vehicle direction and an application of pressure to the brake pedal 126, the brake spring 26 will be promptly wrapped against the inside wall of the inner hub 52 by operation of the electromagnet 48. This locks the hub 52 to the wheel suspension. The outer hub 74 continues its counterclockwise rotation, as appears in FIG. 3, causing the torsion spring 68 to wind inwardly away from the outer hub 74, such winding of the torsion spring being the result of continued rotation of the wheel being braked. The controller 120 notes this condition by reason of the stoppage of the square wave generated by the teeth of the inner hub 52 and the continued generation of a square wave by the teeth 76 of the outer hub 74. By a pulse count representing the teeth 76 passing through the notch 106, the controller 120 measures the extent to which the torsion spring 68 is being wound inwardly. After a predetermined number of counts, such as twenty pulses, the controller terminates the electromagnet operating voltage appearing on the conductor 128. This releases the magnetic attraction of the end 46 of the brake spring 26 with the consequence that the spring 26 quickly relaxes from the inner hub 52. As soon as such relaxation occurs, energy stored within the torsion spring 68 which has been accumulated by the continuing counterclockwise rotation of the outer hub 74 acts through the lug 70 of the torsion spring 68 to advance the inner hub 52 in the counterclockwise direction, as appears in FIG. 3, such that the inner hub 52, now released by the brake spring 26, can accelerate as if to catch up with the continuing rotation of the outer hub 74. The controller 120 detects this catch-up motion of the inner hub 52 by comparing the difference between pulses representing the number of teeth of the outer hub 74 which have passed through the notch 106 and the number of teeth of the inner hub 52 which have passed through the notch 108. It will be noted that this pulse count need not be subtracted on a one-for-one basis inasmuch as the angles subtended by the inner hub teeth 60 need not be the same as the angles subtended by the outer hub teeth 76, and the electronics associated with the controller 120 can be easily designed to account for such differences.

Inasmuch as the inner hub 52 is now being accelerated appreciably to catch up with the outer hub 74, the inner hub 52 will have the tendency to overshoot the outer hub 74. To prevent this, the electronics associated with the controller 120 are set to permit the electromagnets 24 and 48 to remain deenergized until the inner hub 52 has caught up all but five tooth counts of the lead of the outer hub 74, whereupon the electromagnets 24 and 48 are again energized. Since the inner hub will now be rotating in the counterclockwise direction with respect to the brake spring 26, the energization of electromagnet 48 will cause the brake spring 26 to quickly wrap against the internal wall of the hub 52 with the result that the hub 52 is immediately braked and brought to rest with respect to the spider 30.

It should be noted, of course, that the catch-up motion of the inner hub 52 powered by the torsion spring 68 has resulted in a transfer of potential energy stored in the torsion spring 68 to kinetic energy developed in the inner hub 52, which energy must now be absorbed by the generation of heat as the brake spring 26 is once again wrapped against the inside wall of the inner hub 52.

After the second winding of the brake spring 26 against the inner hub 52, the outer hub 74, continuing its now decelerated advance, proceeds another twenty tooth counts in the counterclockwise direction ahead of the inner hub 52, and the braking cycle is repeated an indefinite number of additional times until the forward movement of the vehicle has been stopped by a transfer of kinetic vehicle energy into thermal energy associated with the tires, the torsion spring 68 and the brake spring 26. It will be noted, of course, that the rotational degrees by which the inner hub 52 is permitted to catch up with the outer hub 74 must generally offset the torsional rotation of the torsion spring 68 during periods of braking so as not to produce a cumulative effect such as could lead to a permanent distortion of the torsion spring 68.

The foregoing description of the operation of the subject brake mechanism assumed braking of the left front wheel at a time when the vehicle was traveling in a forward direction. Should the vehicle have been traveling in the reverse direction, the same braking mechanism would be used, the only difference in operation being that the electromagnet device 24 would be the device which initiates braking by biasing the lower end 28 of the brake spring 26 outwardlly against the internal wall of the inner hub 52, the lug 44 of the spider 30 then functioning to resist a clockwise rotation of the brake spring 26 and thereby forcing the brake spring 26 to wind outwardly against the internal wall of the inner hub 52.

Of course, during braking of a vehicle undergoing reverse movement, the upper lug 72 of the torsion spring 68 is advanced in the clockwise direction relative to the lower lug 70, and this causes the torsion spring 68 to expand outwardly as if to seize the internal wall of the outer hub 74. While the torsion spring 68 might have been designed oppositely by changing the handedness of that spring, it is preferred for purposes of the present invention that the torsion spring 68 be designed to contract inwardly during the braking of forward motions of the vehicle and outwardly during the braking of reverse motions of the vehicle.

Those skilled in the art will appreciate the arbitrariness of the suggestion that the controller 120 would count twenty teeth of the outer hub 74, when leading the inner hub 52, before releasing whatever electromagnet is effecting the braking action. For purposes of describing the present invention, one might equally have said that the outer hub 74 is permitted to lead the inner hub 52 by an arbitrary number of rotational degrees, such as 5°, 30° or 100°. These considerations affect only the smoothness or possible jerkiness by which the braking action is accomplished.

In an earlier portion of this description, it has been also indicated that a rotation of perhaps 30° is required after electromagnets 24 and 48 have been energized before the brake spring 26 has wound outwardly against the interior wall of the inner hub 52, thus to stop the rotation of that hub. This means that one cannot stop the vehicle until after the vehicle wheel or wheels being controlled by the brake system have rotated a minimum number of degrees following the time of brake application. Thus, in some applications, such as vehicle parking, which may involve very short wheel movements, the braking mechanism of the present invention may be supplemented by any suitable auxiliary brake, such as a hand brake (not shown).

Referring to FIG. 6, there is illustrated in solid lines one brake pedal and one pair of magnet devices labeled 24a and 48a. For most vehicular applications, there will be at least two wheels, i.e., two front wheels or two back wheels, which one desires to brake equally in response to an application of pressure to a single brake pedal. This is accomplished readily in the present invention by simply extending the conductor to connect to a second brake mechanism (not shown) which substantially duplicates the one already described and which simultaneously brakes the second wheel.

The foregoing description of this invention has been addressed to a nondriven wheel. In the modification of FIG. 5, the interior wall 130 of an outer hub 132 has been modified for a splined connection, as opposed to a bearinged connection, to a driven axle 134. To this end, the axle 134 is provided with flutes 136 interfitting suitably shaped ribs (not appearing in the drawings) which are formed in the internal wall 130. As was true with the outer hub 74 of the embodiment previously described, the modified hub 132 may have outwardly extending threaded bolts 138 for attachment thereto of a conventional wheel member 140. The modified hub 132 functions in the brake system being described in generally the same fashion as does the outer hub 74 previously described.

Thus, the outer hub 132 which is splined to the axle 134 surrounds an inner hub 142 journalled by bearings 144 to rotate freely about the interior wall 130 of the hub 132. A brake spring 146 floatably caged by a spider 148 equivalent to the spider 30 which has been previously described is magnetically actuable to wrap within the inner hub 142 by means of an electromagnet 150 analogous to the electromagnet 48 previously described, such electromagnet when energized being effective to brake forward direction movements of the outer hub 132. A corresponding electromagnet, not illustrated in FIG. 5 but shown schematically in FIG. 6 and there identified by the reference number 152a, is utilized for braking reverse direction movements of the outer hub 132 in the same fashion as did the electromagnet 24 described earlier in this specification.

The operation of the brake mechanism as heretofore described has involved sequential periods of braking when an electromagnet energizing voltage was applied to the conductor 128 followed by a brake release and catch-up of the inner hub when the solenoids 24 and 48 were deenergized. While these periods of alternate brake and brake release may endure only a few milliseconds and thus not be noticeable to the vehicle operator, the fact is that during a period in which a vehicle is being decelerated from an operating speed to stoppage, a braking force is being applied only approximately fifty percent of the time.

To render the braking system more effective, the present invention contemplates a complete braking system utilizing the mechanisms previously discussed, which brakes all wheels of the vehicle. A first pair of solenoids, such as the forward and reverse solenoids 48a and 24a schematically illustrated in FIG. 6, would be applied to each nondriven wheel, typically the two front wheels of the vehicle. A second pair of forward and reverse electromagnets 150a and 152a, such as schematically illustrated in FIG. 6, are also applied to each driven wheel of the vehicle, normally the two rear wheels of the vehicle. Assuming the controller 120 is set to allow each brake to operate during the arbitrarily selected twenty-tooth lead of the outer hub relative to the inner hub, one set of electromagnets, such as the nondriven wheel magnets 24a and 48a (one set for each nondriven wheel), are not initially energized, and only the driven wheel electromagnets 150a and 152a are energized for the first twenty-tooth count of the outer hubs associated with such driven wheels. When the twenty-tooth count is reached for the driven wheels, the controller 120 transfers the voltage from a conductor 154 which supplies voltage for braking the driven wheels to the conductor 128 so as to initiate braking of the nondriven wheels, allowing the nondriven wheels to brake for a count of twenty teeth of the outer hubs 74 thereof. During this tooth count, which is referenced to the nondriven hubs 52, the inner hubs associated with the driven wheels are permitted to catch up with the outer hubs associated with the driven wheels; and at the completion of the count associated with this catch-up, the controller 120 shifts the braking voltage from the conductor 128 to the conductor 154 so as to permit the inner hubs of the nondriven wheels to catch up as the driven wheels resume the braking duty. This type of system, wherein the braking duty is periodically shifted from driven wheels to nondriven wheels and vice versa, enables a substantially continuous braking force to be applied to the vehicle.

Those skilled in the art will appreciate that the controller 120 can include circuitry which will recognize any sudden decrease in the rate at which the teeth associated with the outer hubs are being counted. Such sudden decrease would mean that the wheel being braked is commencing a skid, such as on an icy surface.

To minimize skidding conditions, the electronics associated with the controller 120 can be programmed to deenergize whatever electromagnets are then energized to reduce braking and simultaneously transfer to non-braking wheels the duty of resuming the braking operation then being commanded by the brake pedal 126.

In the preferred mode of operation, the count of teeth by which the outer hub is permitted to lead the locked inner hub is controlled by the braking pressure applied to the brake pedal 126, a light pressure programming the controller for a small count of teeth and a heavier pressure programming a larger number of teeth. Since the count of teeth indicates relative displacement of the hub members 52 and 74, and such displacement is resisted by the torsion spring 68, the count of teeth also represents the potential energy accumulated in the torsion spring 68 from the kinetic energy of the wheel 98 as the braking occurs.

Figure 7:
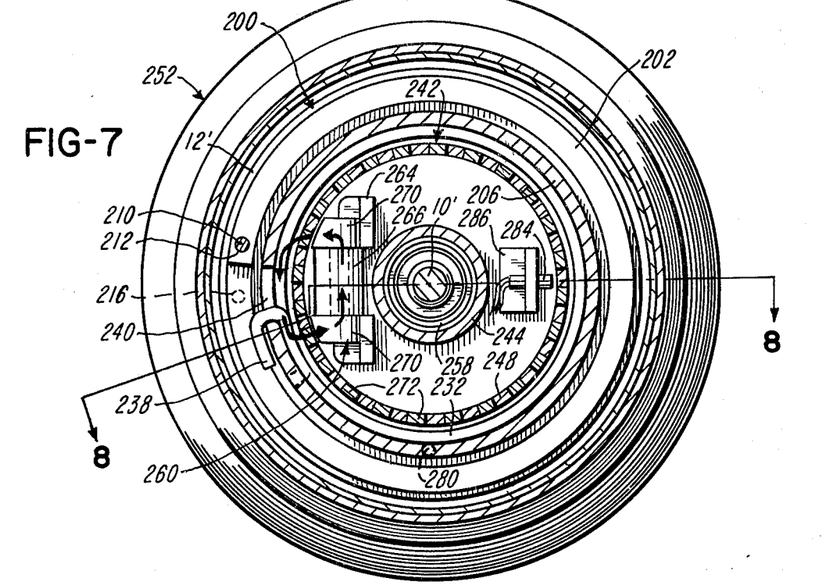
FIG. 7 is an elevation view with parts broken away analogous to FIG. 1 and illustrating a presently preferred embodiment of a brake assembly in accordance with the present invention.
Figure 8:
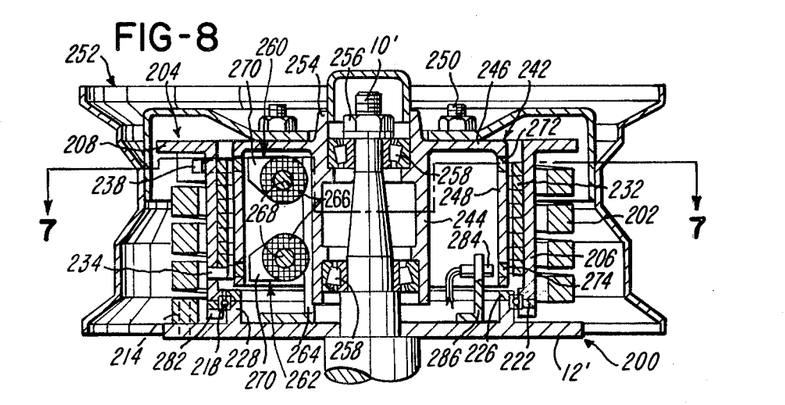
Figure 9:
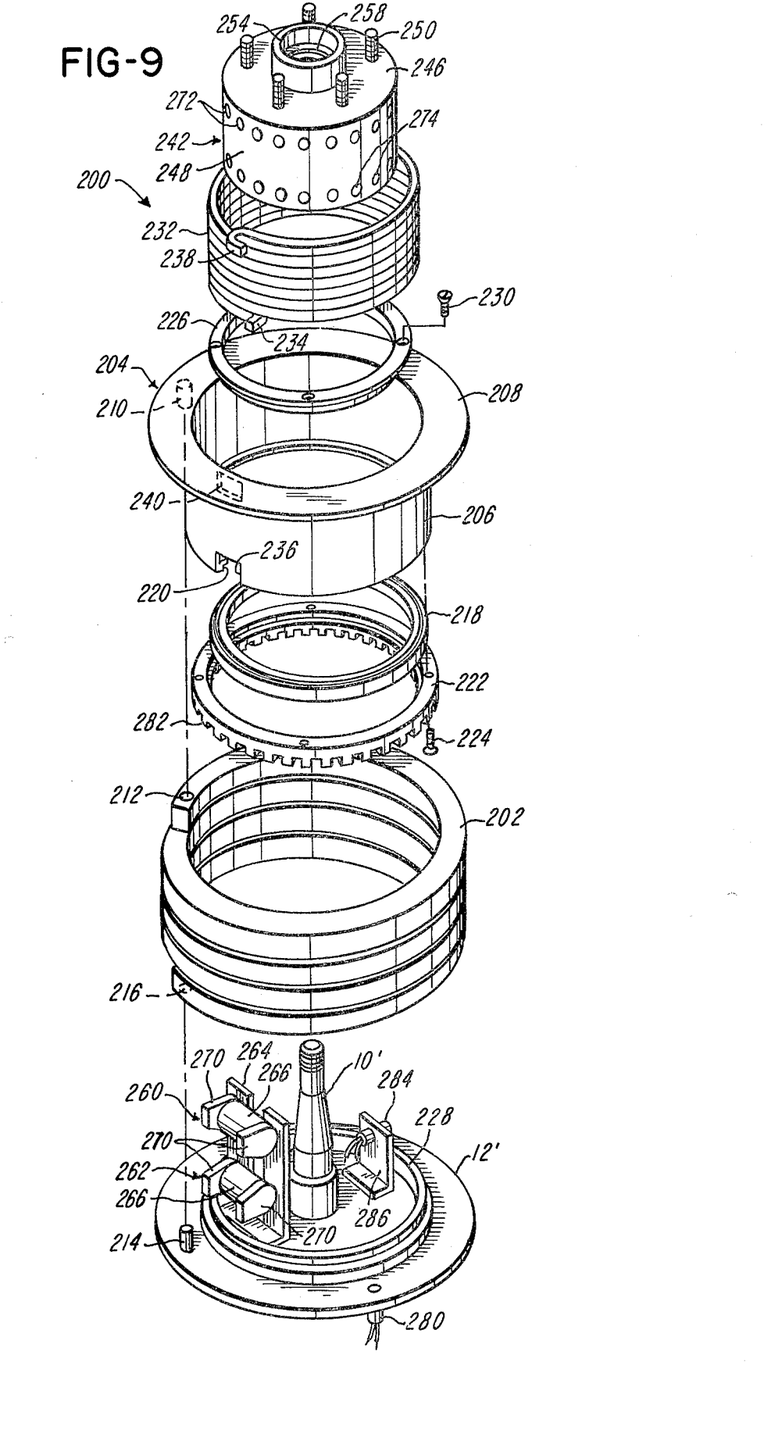
FIG. 9 is an exploded perspective view of the embodiment of FIG. 7.

With reference to FIGS. 7–9 another embodiment of a brake assembly generally designated 200 is illustrated in reference to a stationary axle 10' of the nondriven wheel of a vehicle. A plate member 12' receives the axle 10' and forms a fixed part of a vehicle suspension. A torsion spring member 202 that is of the same character as the torsion spring member 68 is located, in the embodiment of FIGS. 7–9, in position to coact between, and thus resiliently connect, the plate member 12' with an intermediate hub 204.

The intermediate hub 204 comprises a substantially cylindrical, hollow tubular body member 206 having an end most remote from the plate member 12' provided with a radially outwardly extending flange 208 from which a driven pin 210 extends. The driven pin 210 projects into an aperture 212 at one end of the torsion spring 202. A retaining pin 214 projects outwardly from the plate member 12' into another aperture 216 at the other end of the torsion spring 202. The intermediate hub 204 is mounted for rotation on the fixed plate member 12' by a ball bearing assembly 218, the outer race of which is clamped to the intermediate hub 204 between a notched flange 220 projecting radially inwardly from the end face of the intermediate hub 204 closest to the plate 12' and a retaining ring 222 which is affixed to the flange 220 as by screws 224. The inner race of the bearing assembly 218 is clamped between a clamping ring 226 and a notched annular support 228 formed on the plate 12'. These parts may be fastened together as by screws 230.

The brake spring in the embodiment of FIGS. 7–9 comprises a coil spring 232, one end of which projects radially outwardly from its axis to form a lug 234 that projects into a notch 236 formed in the end of the intermediate hub 204 closest to the fixed plate 12'. The other end of the brake spring 232 is bent back on itself to form a hook 238 that projects through a rectangular aperture 240 that is axially aligned with the notch 236 in the hub body 206 but spaced further from the fixed plate member 12' than is the notch 236. The brake spring 232 is preferably slightly stressed when assembled into the intermediate hub 204 so that, until actuated as described below, it is retained centered in the intermediate hub 204 and against or closely adjacent the inside wall of the hub body member 206. Its ends 234 and 238, therefore, would be slightly biased into engagement with opposite walls of the notch 236 and the aperture 240.

A cylindrical wheel hub 242 that is concentric with the brake spring 232, the intermediate hub 204 and the torsion spring 202 is received within the brake spring 232. The hub 242 is made from aluminum or other nonmagnetic material. As shown in FIG. 8, it includes a tubular internal wall 244 mounted for rotation on the axle 10', an end wall 246 and an outer tubular wall 248 that is concentric with the internal wall 244. Plural wheel mounting lugs 250 projecting from the end wall 246 are used for receiving and thereby connecting a conventional wheel rim 252 to the wheel hub 242. The end of the internal wall 244 farthest from the fixed plate member 12' is formed as a collar 254 that receives a nut 256 for retaining the wheel hub 242 against axial movement relative to the axle 10'. As conventional, the wheel hub 242 is free to rotate relative to the axle 10' by virtue of being supported thereon by bearing assemblies 258.

The internal diameter of the brake spring 232 as slightly stressed to be retained centered in the intermediate hub 204 is greater than the outer diameter of the wheel hub outer wall 248. Accordingly, except when the brake assembly 200 is actuated as will be described below, the wheel hub 242 rotates without restriction. All other parts of the brake assembly 200 are stationary. As will be readily understood in view of the discussion of operation of the embodiment of FIG. 1 described above, the brake spring 232 is caused to engage and commence wrapping itself upon the outer surface of the hub outer wall 248 to brake the rotation of the wheel hub 242. As the brake spring 232 wraps against the wheel hub 242, one of the ends 234 and 238 urges the intermediate hub 204 to rotate with the wheel hub 242. Rotation of the intermediate hub 204 is resisted by virtue of its connection to the fixed plate member 12' by the torsion spring member 202, the function and operation of which should be clear from the preceding description. Thus, regardless of the direction in which the intermediate hub 204 is urged to rotate, the torsion spring member 202 will resiliently resist its movement. Whether a wall of the notch 236 or a wall of the aperture 240 is drivingly engaged by the brake spring ends 234 or the hook 238 respectively, will depend upon the direction of rotation of the wheel hub 242 at the time braking occurs. The end 238 is formed as a hook to have maximum strength in driving the intermediate hub 204 when braking from a "forward" direction of rotation of the wheel hub 242, arbitrarily being counterclockwise in FIG. 7.

The brake spring 232 is caused to become attracted and commence wrapping upon the wheel hub 242 by the operation of either one of a pair of electromagnets, generally designated 260 and 262, the function of which is essentially the same as the previously described electromagnets 24 and 48 respectively. The electromagnets 260 and 262 may be mounted upon the fixed plate member 12' by an L shaped bracket 264. Each comprises a coil 266 wrapped around a core piece 268 and having pole pieces 270. If, for example, the electromagnet 260 were energized, a flux path would be generated, as illustrated in FIG. 7, extending through the core 268 and the associated pole pieces 270 through plugs 272 made from a suitable ferromagnetic material such as steel, lodged in a band of arcuately spaced apertures in the outer wall 248 of the wheel hub 242 aligned generally with the pole pieces 270. The flux path also extends through portions of the brake spring 232 causing it to be attracted to the hub outer wall 248. The electromagnet 262 which would be energized to brake rotation of the wheel hub 242 in a direction opposite to the rotation braked by operation of electromagnet 260 creates essentially the same flux path but in this case through ferromagnetic plugs 274 in a row of apertures spaced from the apertures receiving the plugs 272 and aligned with the pole pieces 270 of the electromagnet 262. The counterclockwise (as viewed in FIG. 7) or "forward" direction of rotation of the wheel hub 242 would be braked by actuation of the electromagnet 262, to thereby cause the end of the brake spring 232 closest to the plate 12' to be attracted to the wheel hub 242.

When it is intended to bring the wheel hub 242 to rest from high speed, it will be necessary to intermittently energize the appropriate one of the two electromagnets 260 and 262 for the same reason as described above in connection with the embodiment of FIG. 1. In the embodiment of FIGS. 7-9, the potential energy accumulated by the torsion spring member 202 is dependent upon the angle of rotation of the intermediate hub 204 relative to the stationary plate 12'. Such relative rotation, and thus the potential energy accumulated by the torsion spring member 202, can be monitored by a sensor 280 affixed to and projecting through the flat plate member 12' which senses teeth 282 formed on the retaining ring 222 confronting the flat plate member 12'. Since the number of teeth 282 moving past the sensor 280 is directly dependent upon the angle through which the intermediate hub 204 rotates, the sensor 280 can be utilized in control circuitry similar to that shown in FIG. 6 to cause intermittent actuation of the electromagnets 260 or 262 as needed to prevent wheel lockup when braking pressure is applied.

In the embodiment of FIGS. 7-9, it may not be necessary to sense relative rotation of the intermediate hub 204 and the wheel hub 242. However, rotation of the wheel hub 242 can readily be detected by a sensor 284 mounted on the plate member 12' by a bracket 286 that senses movements of the plugs 274 therepast. As those familiar with control circuitry are aware, electrical circuitry associated with the sensor 284 may be used to detect an unusually abrupt stoppage of rotation of the wheel hub 242. This would indicate a locked wheel or skid condition so such circuitry could act as an override to momentarily deenergize the energized one of the two electromagnets 260 and 262.

The embodiment of FIGS. 7-9 is presently preferred because of the simplicity of construction and because the only rotating mass, except when braking, is the mass of the wheel hub 242. This feature may also simplify or avoid problems associated with dynamically balancing the entire wheel and brake assembly.

Further, it may be possible to construct simpler and more efficient and more accurate electronic controls for pulsing the electromagnets 260 and 262 since only the sensor 280 is needed to monitor changes in the stress or potential energy of the torsion spring 202.

It is readily apparent that the embodiment of FIGS. 7-9 may be modified for use with a driven wheel. In such case, the axle and the wheel hub 242 would be locked together and a bearing would be provided between the axle and the fixed plate 12'.

Although the preferred embodiments of this invention have been described, it will be understood that various changes may be made within the scope of the appended claims.

Having thus described my invention, I claim:
1. A brake for a vehicle wheel, comprising:
an inner hub supported for rotation about the axis of rotation of said wheel;
an outer hub supported for rotation about said axis;
a helically wound torsion spring located between said inner hub and said outer hub and connected between said inner hub and said outer hub so that the rotation of said wheel is imparted to said inner hub;
a helically wound brake spring located within said inner hub adjacent and surrounded by an inner wall of said inner hub;
support means supporting said brake spring within said inner hub including a support plate adapted to be nonrotatably attached to a vehicle and a spider member attached to said support plate and generally disposed within the convolutions of said brake spring;
a first abutment on said support plate for engaging and restraining rotation of one end of said brake spring in one direction about said axis;
a second abutment on said spider member for engaging and restraining rotation of the outer end of said brake spring in an opposite direction about said axis;
first and second electromagnets attached to said support means for radially outwardly biasing portions of said brake spring near said one and said other ends so that said brake spring may expand radially to self wrap against and engage and abruptly stop the rotation of said inner hub in either direction; and
electrical circuit means for selectively energizing said first and second electromagnets to accomplish the biasing of said portions of said brake spring.
2. A brake for a vehicle wheel, comprising:
an inner hub supported for rotation about the axis of rotation of said wheel;
an outer hub supported for rotation about said axis;
a helically wound torsion spring located between said inner hub and said outer hub and connected between said inner hub and said outer hub so that the rotation of said wheel is imparted to said inner hub;
a helically wound brake spring located within said inner hub adjacent and surrounded by an inner wall of said inner hub;
support means supporting said brake spring within said inner hub including a support plate adapted to be nonrotatably attached to a vehicle and a spider member attached to said support plate and generally disposed within the convolutions of said brake spring;
a first abutment on said support plate for engaging and restraining rotation of one end of said brake spring in one direction about said axis;
a second abutment on said spider member for engaging and restraining rotation of the other end of said brake spring in an opposite direction about said axis;
electromagnet means attached to said support means or said spider member for radially outwardly biasing a portion of said brake spring so that said brake spring may expand radially to engage and self-wrap against said inner wall of said inner hub and abruptly stop the rotation of said inner hub; and
electrical circuit means for energizing said electromagnet means to accomplish the biasing of said portion of said brake spring.
3. In a mechanism for braking a wheel supported for rotation about a rotary axis by suspension means having a nonrotatable portion:

first hub means supported for rotation about said rotary axis, said first hub means having a wall surrounding said axis;

second hub means connected to said wheel for rotation therewith and supported for rotation about said rotary axis;

brake means for preventing relative rotation between said first hub means and said nonrotatable portion, said brake means comprising brake spring means having convolutions coiled helically about said axis adjacent said wall, a portion of said brake spring means being restrained against rotation about said axis, and magnetic means for biasing another portion of said brake spring means into frictional engagement with said wall;

second spring means connected between said first hub means and said second hub means for coupling said first hub means to said wheel so that, upon actuation of said brake means, the rotation of said wheel is imparted to and accumulated as potential energy in said second spring means;

means for monitoring the accumulation of potential energy in said second spring means; and means responsive to said monitoring means for disabling said brake means so as to release the accumulated potential energy in said second spring means before a lockup of said second spring means occurs.

4. The braking mechanism of claim 3 wherein said second spring means is a torsion spring.

5. The braking mechanism of claim 4 wherein said torsion spring surrounds said axis.

6. The braking mechanism of claim 5 wherein said torsion spring is coiled helically between said first and second hub means.

7. The braking mechanism of claim 3 wherein said magnetic means includes an electromagnet nonrotatably supported adjacent said another portion of said brake spring means and biasing said another portion radially outwardly into engagement with said wall.

8. In a mechanism for braking a wheel supported for rotation about a rotary axis by suspension means having a nonrotatable portion;

first hub means supported for rotation about said rotary axis;

second hub means connected to said wheel for rotation therewith and supported for rotation about said rotary axis, said second hub means having a wall surrounding said axis;

brake means for preventing relative rotation between said first hub means and said second hub means, said brake means comprising brake spring means having convolutions coiled helically about said axis adjacent said wall, a portion of said brake spring means being restrained against rotation about said axis, and magnetic means for biasing another portion of said brake spring means into frictional engagement with said wall;

second spring means connected between said first hub means and said nonrotatable portion for coupling said first hub means to said nonrotatable portion so that, upon actuation of said brake means, the rotation of said wheel is imparted to and accumulated as potential energy in said second spring means;

means for monitoring the accumulation of potential energy in said second spring means; and means responsive to said monitoring means for disabling said brake means so as to release the accumulated potential energy in said second spring means before a lockup of said second spring means occurs.

9. The braking mechanism of claim 8 wherein said second spring means is a torsion spring.

10. The braking mechanism of claim 9 wherein said torsion spring surrounds said axis.

11. The braking mechanism of claim 10 wherein said torsion spring is coiled helically around said first hub means.

12. The braking mechanism of claim 8 wherein said magnetic means includes an electromagnet nonrotatably supported adjacent said another portion of said brake spring means and biasing said another portion radially into engagement with said wall.

13. In a mechanism for braking a wheel supported for rotation about a rotary axis by suspension means having a nonrotatable portion:

an intermediate member supported for rotation about said rotary axis;

wheel hub means connected to said wheel for rotation therewith about said rotary axis;

at least one of said nonrotatable portion, said intermediate member, and said wheel hub means having a wall surrounding said axis;

brake means for preventing relative rotation between said intermediate member and a second member comprising one of said wheel hub and said nonrotatable portion, means comprising brake spring means having convolutions coiled helically about said axis adjacent said wall, means for restraining one portion of said brake spring means against rotation about said axis, and magnetic means for biasing another portion of said brake spring means into frictional engagement with said wall;

second spring means for coupling said intermediate member and the other of said wheel hub means and said nonrotatable portion so that, upon actuation of said brake means, the rotation of said wheel is imparted to and accumulated as potential energy in said second spring means;

means for monitoring the accumulation of potential energy in said second spring means; and means responsive to said monitoring means for disabling said brake means so as to release the accumulated potential energy in said second spring means before a lockup of said second spring means occurs.

14. The braking mechanism of claim 13 wherein said second spring means is a torsion spring.

15. The braking mechanism of claim 14 wherein said torsion spring surrounds said axis.

16. The brake mechanism of claim 15 wherein said torsion spring is coiled helically around said axis.

17. The braking mechanims of claim 13 wherein said magnetic means includes an electromagnet nonrotatably supported adjacent said another portion of said brake spring means and biasing said another portion radially into engagement with said wall.

* * * * *

UNITED STATES PATENT AND TRADEMARK OFFICE
CERTIFICATE OF CORRECTION

PATENT NO. : 4,257,497
DATED : March 24, 1981
INVENTOR(S) : Karl S. Schroeder

It is certified that error appears in the above-identified patent and that said Letters Patent are hereby corrected as shown below:

Col. 8, line 63, "outwardlly" should be ---outwardly---.

Col. 14, line 19, "outer" should be ---other---.

Signed and Sealed this

Fifteenth Day of December 1981

[SEAL]

Attest:

GERALD J. MOSSINGHOFF

*Attesting Officer*     *Commissioner of Patents and Trademarks*